US012427897B2

(12) United States Patent
Lloyd et al.

(10) Patent No.: US 12,427,897 B2
(45) Date of Patent: Sep. 30, 2025

(54) CHILD SAFETY SEAT

(71) Applicant: GEORGE TFE SCP, Monaco (MC)

(72) Inventors: John George Lloyd, Monaco (MC);
Piers Christian Storey, Monaco (MC)

(73) Assignee: GEORGE TFE SCP, Monaco (MC)

( * ) Notice: Subject to any disclaimer, the term of this patent is extended or adjusted under 35 U.S.C. 154(b) by 173 days.

(21) Appl. No.: 18/255,056

(22) PCT Filed: Dec. 13, 2021

(86) PCT No.: PCT/IB2021/061618
§ 371 (c)(1),
(2) Date: May 30, 2023

(87) PCT Pub. No.: WO2022/130159
PCT Pub. Date: Jun. 23, 2022

(65) Prior Publication Data
US 2024/0051440 A1 Feb. 15, 2024

(30) Foreign Application Priority Data
Dec. 14, 2020 (EP) ..................................... 20020613

(51) Int. Cl.
*B60N 2/28* (2006.01)
(52) U.S. Cl.
CPC ................................. *B60N 2/2884* (2013.01)
(58) Field of Classification Search
CPC ................................................... B60N 2/2884
See application file for complete search history.

(56) References Cited

U.S. PATENT DOCUMENTS

| 4,265,484 A * | 5/1981 | Stalter ................... A47C 27/16 297/452.57 |
| 5,649,721 A | 7/1997 | Stafford |
| 6,245,408 B1 * | 6/2001 | Bitzer ..................... F16F 7/121 428/118 |
| 8,348,337 B2 * | 1/2013 | Franck ................ B60N 2/2809 297/216.19 |

(Continued)

FOREIGN PATENT DOCUMENTS

| DE | 102020116926 A1 * | 8/2021 |
| EP | 2368752 A2 | 9/2011 |

(Continued)

*Primary Examiner* — Timothy J Brindley
(74) *Attorney, Agent, or Firm* — Jason L DeFrancesco

(57) ABSTRACT

Child safety seat (1) for a vehicle (30) comprising a frame (2) shaped so as to accommodate a child (40) in a child area (3), the frame (2) comprising a sitting portion (2A), a backrest portion (2B) and side portions (2C); at least one impact absorbing assembly (4) connected to the frame (2) and comprising: a deformable polymeric layer (5); at least one honeycomb cellular insert (6) associated with the deformable polymeric layer (5). The at least one honeycomb cellular insert (6) comprises a plurality of open cells (7) having longitudinal axes (L) extending out of an inner/outer surface of the frame (2), said cells (7) being configured to absorb energy by plastic deformation in response to a longitudinal compressive load applied to said cells (7); and the deformable polymeric layer (5) is shaped so as to contain the at least one honeycomb cellular insert (6).

18 Claims, 2 Drawing Sheets

(56) References Cited

U.S. PATENT DOCUMENTS

| | | | | |
|---|---|---|---|---|
| 8,998,318 | B2* | 4/2015 | Gaudreau, Jr. | B60N 2/2872 |
| | | | | 297/256.16 |
| RE47,971 | E * | 5/2020 | Tanner | B60N 2/2821 |
| 10,988,057 | B2* | 4/2021 | Maciejczyk | B60N 2/2884 |
| 11,235,687 | B2* | 2/2022 | Will | B60N 2/2875 |
| 2009/0066125 | A1* | 3/2009 | Nett | B60N 2/2884 |
| | | | | 297/216.13 |
| 2009/0121400 | A1* | 5/2009 | Schrooten | B60N 2/2872 |
| | | | | 267/160 |
| 2011/0062756 | A1* | 3/2011 | Campbell | B60N 2/2851 |
| | | | | 297/250.1 |
| 2011/0227376 | A1 | 9/2011 | Franck | |
| 2012/0306243 | A1 | 12/2012 | Oltman | |
| 2016/0059748 | A1* | 3/2016 | Cohen | B60N 2/286 |
| | | | | 297/468 |
| 2017/0021745 | A1* | 1/2017 | Oswald | B60N 2/888 |
| 2020/0290489 | A1* | 9/2020 | Stacey | B60N 2/2842 |

FOREIGN PATENT DOCUMENTS

| | | | |
|---|---|---|---|
| FR | 3136413 A1 * | 12/2023 | |
| WO | 2010014122 A1 | 2/2010 | |

* cited by examiner

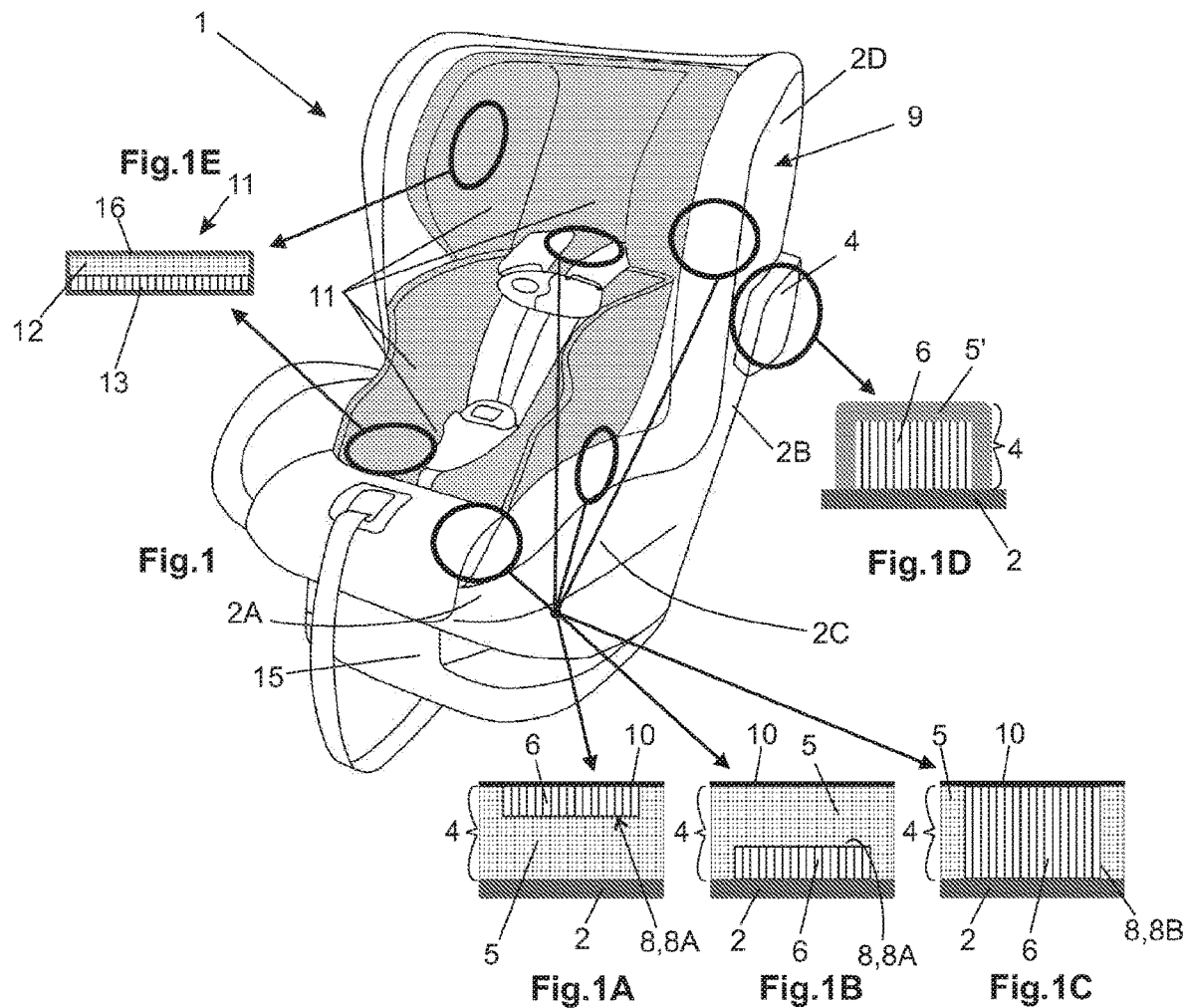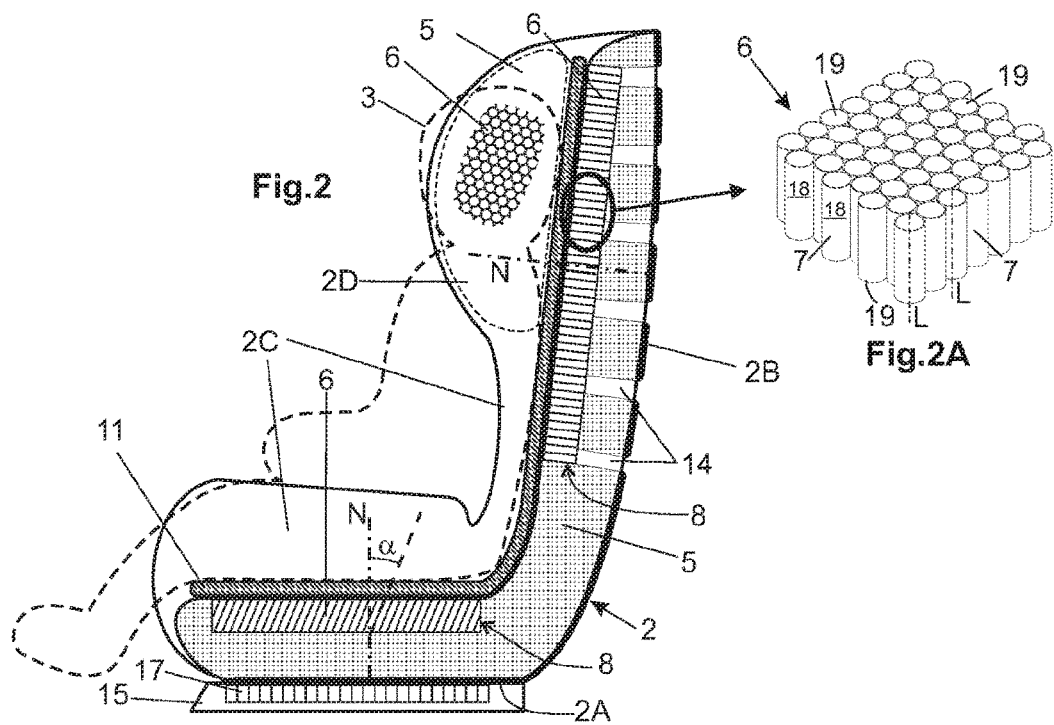

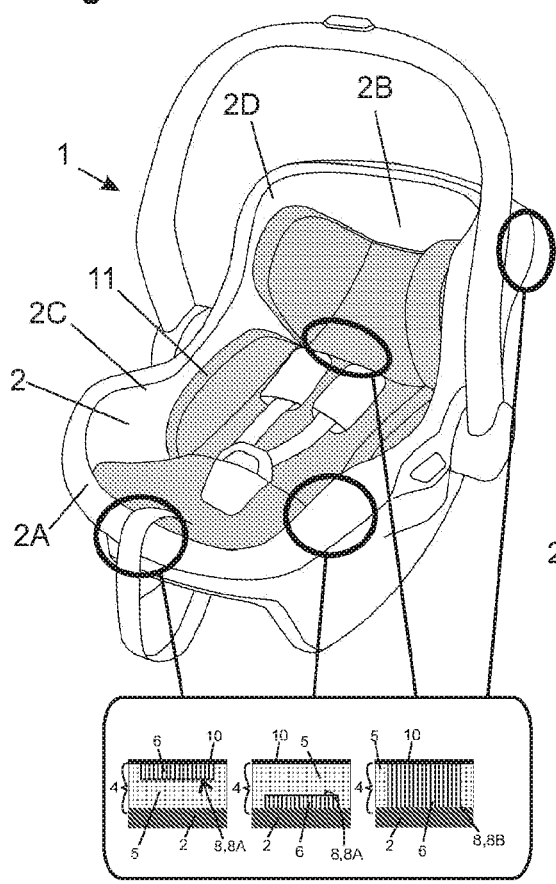
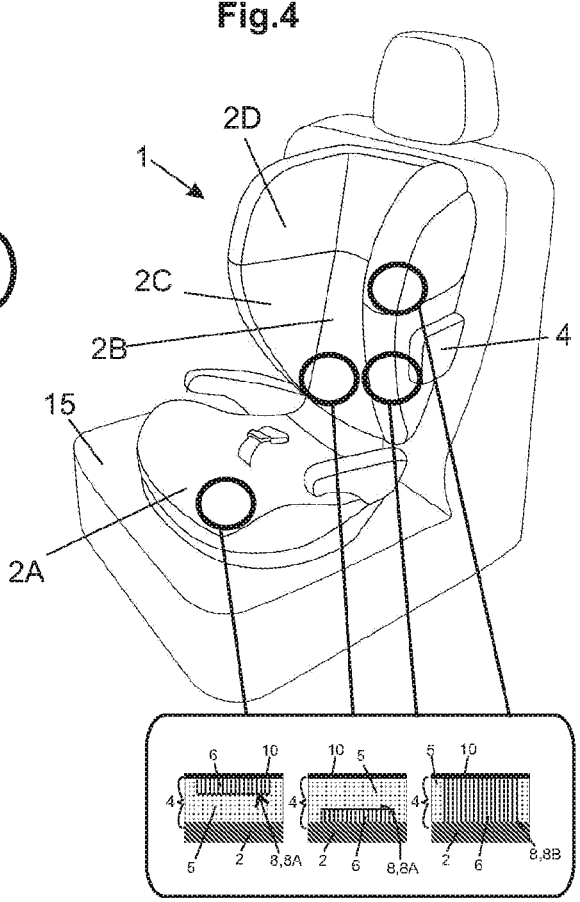
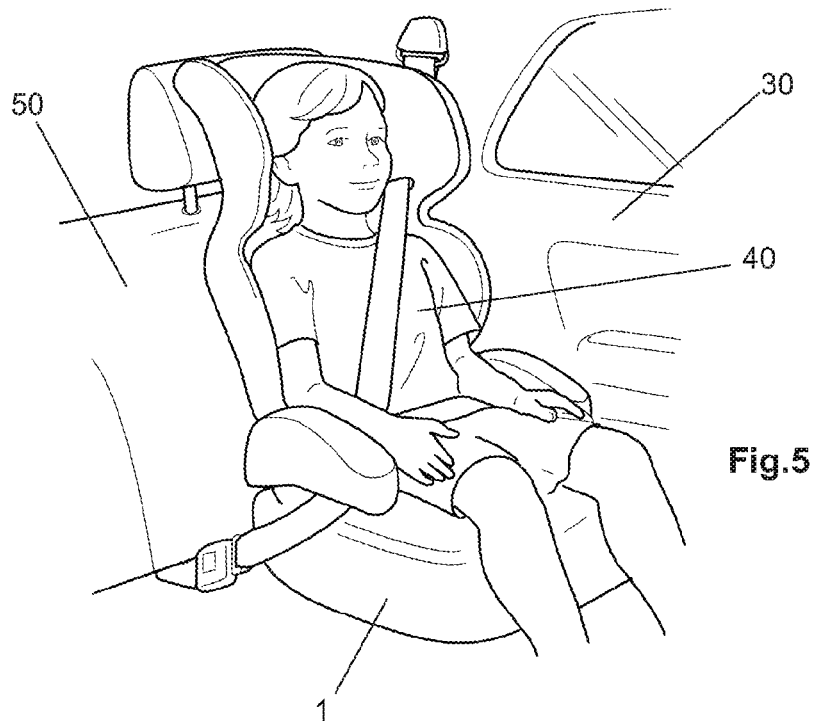

CHILD SAFETY SEAT

TECHNICAL FIELD

The present invention relates to the field of child safety seats for vehicles, in particular to safety seats that can be positioned on car seats for protecting a child or infant in case of a car accident.

BACKGROUND ART

In the state of the art child safety seats for cars are well-known. Generally, they comprise a frame made of plastic and an EPP (Expanded Polypropylene) pad attached to the inner side of the frame. A seat cover is also configured to cover both the frame and the EPP pad.

The EPP pad absorbs the energy of an impact during a car accident and protects the child against injuries.

The norms setting the technical requirements of child safety seats are becoming year over year more severe and the above-cited traditional child safety seats are no more able to fit with these requirements.

In particular, the traditional child safety seats are not able to satisfy the new safety requirements because the EPP pad of the seat absorbs only a portion of the energy released during an impact and the rest of the energy is transferred to the child. In addition to national and regional testing norms, even consumers' associations perform their own tests on child safety seats and provide their rating on the marketed products.

It's thus an actual need to find a technical solution able to increase the energy absorbed by the safety seat in an economic, cleanable, light and simple way.

Solutions for increasing the energy absorbed by a child safety seat are known in the state of the art. Document US20120306243A1 relates to a child safety seat wherein a honeycomb cellular structure is connected to the inner side of the seat through a foam liner. Documents WO2010014122A1 and EP2368752A2 relate to energy-absorbing structures arranged on the outer side of the child seat. Document US20110227376A1 relates to an energy-absorbing structure arranged below the child seat. Document U.S. Pat. No. 5,649,721A relates to use of honeycomb material in front of an airplane seat.

Furthermore, actual child safety seat are not enough breathable and the child suffers the heat, in particular during the warm season.

SUMMARY

Said and other inconveniences of the state of the art are now solved by a child safety seat for a vehicle, preferably for a car. Said child safety seat comprises a frame shaped for receiving a child in a child area and at least one impact absorbing assembly. The frame comprises a sitting portion, a backrest portion and side portions. The frame is preferably of single-piece integral type, wherein sitting, backrest and side portions are monolithically connected each other. The impact absorbing assembly comprises a deformable polymeric layer and at least one honeycomb cellular insert associated with the deformable polymeric layer. The impact absorbing assembly is connected to the frame. The at least one honeycomb cellular insert comprises a plurality of open cells having longitudinal axes. These longitudinal axes extend out of an inner or outer surface of the frame. Said cells are configured to absorb energy by plastic deformation in response to a longitudinal compressive load applied to said cells. The impact absorbing assembly so conceived allows absorbing more effectively the energy of an impact through the child safety seat, minimizing the injuries to the child. The deformable polymeric layer is shaped so as to hold/contain the at least one honeycomb cellular insert. In this way, lateral movements of the honeycomb cellular insert are limited and the honeycomb cellular insert cannot easily get out the deformable polymeric layer. This fact is particularly important in case of oblique impacts on the child safety seat that cause lateral movements of the child with respect to the seat.

Preferably, said longitudinal axes are at least in part normal to the inner or outer surface of the frame, or least in part inclined by an angle comprised between 5° and 45° with respect to a direction normal to said inner or outer surface of the frame. These two different arrangements of the cells' axes allow to differentiate the degree of energy absorbed by the honeycomb cellular insert.

The impact absorbing assembly can face towards the child area, so it's oriented from the frame towards an area wherein the child can sit. This arrangement allows to maximize the protection for the child's body and arms. According to the present invention, the term "child area" means the portion of the seat wherein the child is accommodated.

In particular, the honeycomb cellular insert can be sized to fit within a recess of the deformable polymeric layer. The outer overall shape of the honeycomb cellular insert is such that the insert remains in the recess even if the honeycomb insert is in-plane compressed against the sidewall/s of the recess. Preferably, the honeycomb cellular insert is retained within the recess by friction. This feature allows to maintain in place the insert even during the assembling activities.

The at least one honeycomb cellular insert can be arranged between the deformable polymeric layer and the frame. Alternatively, the deformable polymeric layer can be arranged between the at least one honeycomb cellular insert and the frame. The two versions differentiate in term of comfort for the children. In particular, when a comfort cushion is absent, the first version is preferable. Furthermore, the deformable polymeric layer is generally easier to mould into complex shapes, therefore the second version is preferred if the frame is designed with a complex inner face geometry.

Advantageously, the recess can be a pocket in which the honeycomb cellular insert is accommodated. In this way, the honeycomb cellular insert is more efficiently held and it cannot get out in case of lateral impacts.

In alternative, the recess can be a pass-through aperture in the deformable polymeric layer in which the at least one honeycomb cellular insert is arranged. In this way, the deformable polymeric layer and the honeycomb cellular insert are flush on the inner and/or outer side. In particular, the deformable polymeric layer and the at least one honeycomb cellular insert can have the same thickness and are arranged side by side. This arrangement allows to maximize the energy absorbing capacities of the child seat.

The deformable polymeric layer and the frame can comprise a plurality of pass-through holes. These holes lie in correspondence of the honeycomb cellular insert. Through these holes of the deformable polymeric layer and frame, and through the open cells of the honeycomb cellular insert the air can freely flow. In this way, the comfort for the child in term of temperature is greatly improved and a better heat transfer is achieved. When the deformable polymeric layer is made of polymeric foam, the duration of the foam layer is negatively affected by high temperatures, consequently thanks to these holes the foam layer is cooled more efficiently and consequently is more durable.

Advantageously, the deformable polymeric layer can be a portion of the baby seat on which the child sits that is preferably made of a rigid polymeric closed-cell foam. The honeycomb cellular insert is thus inserted and embedded directly in the foam portion on which the child stays, improving the energy-absorbing performances of the child seat without radically changing its traditional shape.

Preferably, the child seat can comprise a breathable seat cover configured to cover at least part of the frame and the impact absorbing assembly. This seat cover can be a fabric. This cover ameliorates the visual aspect of the child seat and allows a perspiration.

The at least one honeycomb cellular insert can be arranged in correspondence of said sitting portion so as to lie below the child. Additionally or alternatively, at least one honeycomb cellular insert can be arranged in correspondence of said backrest portion so as to lie behind the spline and/or the head of the child. Additionally or alternatively, at least one honeycomb cellular insert can be arranged in correspondence of said side portions so as to lie besides the shoulders and/or the hips and/or the head of the child. These arrangements of the honeycomb cellular insert/s allow to effectively protect the most sensitive and fragile parts of the child's body.

Additionally or alternatively, the impact absorbing assembly can face outwardly. In this case, the side portions of the frame comprise two lateral head support portions and the impact absorbing assembly is arranged in correspondence of each of said two lateral head support portions. In this case, the deformable polymeric layer can be shaped so as to surround the at least one honeycomb cellular insert for keeping the honeycomb cellular insert in contact with an outer surface of the frame. In particular, the deformable polymeric layer protrudes outwardly from the outer surface of the frame so as to protect the child safety seat from lateral impact, like a bumper. In this way, the energy of side impact is mitigated by the honeycomb cellular insert that absorbs the large part of the energy and spreads the remaining part over the outer surface of the frame.

Advantageously, the child safety seat can comprise a base connectable to the frame and said base can comprise a honeycomb cellular insert. In this way, the sudden frontal movement of the frame with respect to the base during a longitudinal impact, like a fender bender, is absorbed by the honeycomb cellular insert of the base.

Additionally, the child safety seat can also comprise a comfort cushion arranged between the impact absorbing assembly and the child area. The comfort cushion can comprise a soft foam layer arranged toward the child area and a honeycomb cellular layer. The honeycomb cellular layer is layered on the soft foam layer and is arranged between the soft foam layer and the impact absorbing assembly. The soft foam and the honeycomb cellular layers guarantee a greater sitting comfort for the baby and, contemporary, improve the energy absorbing capacity of the child safety seat.

These and other advantages will be better understood thanks to the following description of different embodiments of said invention given as non-limitative examples thereof, making reference to the annexed drawings.

DRAWINGS DESCRIPTION

In the drawings:

FIG. 1 shows an axonometric view of a child safety seat according a first embodiment of the present invention;

FIGS. 1A, 1B, 1C, 1D show a cross-section detail of a sitting, backrest, side or head support portions of the child safety seat of FIG. 1 according to particular embodiments;

FIG. 1E shows a cross-section detail of a comfort cushion of the child safety of FIG. 1 according to a particular embodiment;

FIG. 2 shows a longitudinal cross-section view of a child safety according to the present invention;

FIG. 3 shows an axonometric view of a second type of child safety seat according to the present invention;

FIG. 4 shows an axonometric view of a third type of child safety seat according to the present invention;

FIG. 5 shows a perspective view of a child safety seat according to the present invention arranged in a car.

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

The child safety seat 1 can be of different types as a function of the age and weight of the baby/child. Specifically, a child safety seat 1 can be a rear facing baby seat, a forward facing baby seat or a booster seat. The child safety seat 1 is generally positioned and secured over a seat 50 of a vehicle/car 30 and it is shaped so as to accommodate a baby/child 40, as shown in FIG. 5.

In FIG. 1 is represented a child safety seat 1 according to a first embodiment. The baby seat comprises a frame 2, also called chassis or shell, made of a rigid plastic, that represents the skeleton of the child seat 1. The frame 2 of FIG. 1 comprises right and left side portions 2C, a backrest portion 2B and a sitting portion 2A. These portions are continuous each other. In particular, the backrest portion 2B is continuous with the sitting portion 2C and from them two side portions 2C laterally branch, respectively on the right and left sides. Each side portion 2C can comprise an armrest portion, indicated in FIG. 1 with the reference number 2C, and a headrest portion 2D. The frame 2 is thus a single piece of rigid plastic, on which one or more impact absorbing assemblies 4 are attached. The frame 2 is preferably made of a rigid plastic like polypropylene.

The impact absorbing assembly 4 includes a deformable polymeric layer 5 and an associated honeycomb cellular insert 6 that is contained in the deformable polymeric layer 5. The impact absorbing assembly 4 can be arranged on the inner side of the frame 2, thus towards the child area 3 and/or on the outer face of the frame 2, thus facing outside.

As described in the following, the deformable polymeric layer 5 can be made of a rigid polymer closed-cell foam, when it faces the child area 3. Otherwise, the deformable polymeric layer 5' can be made of rubber or another elastomeric material (not a foam), when it faces outside the child seat.

The child safety seat 1 can comprise one or impact absorbing assemblies 4. When they are more than one, each of above-mentioned seat portions 2A, 2B, 2C, 2D comprises at least one impact absorbing assembly 4. Alternatively, one single impact absorbing assembly 4 covers the whole frame 2 or a part of it.

The honeycomb cellular inserts 6 in the impact absorbing assembly 4 can be one or more than one. Each honeycomb cellular insert 6 comprises a plurality of open cells 7 that are interconnected each other to form a honeycomb sheet. This honeycomb sheet can be flat or curved. Each cell 7 has a longitudinal axis L.

The cells 7 are interconnected each other so that the longitudinal axes L are outwardly oriented with respect to a surface (inner or outer) of the frame 2.

Said cells 7 are configured to absorb energy by plastic deformation in response to a longitudinal compressive load applied along said longitudinal axis L. The term "plastic deformation" means an irreversible deformation of the cell 7.

The cells 7 are preferably tubes, as shown in FIG. 2A. For this reason, the terms cell and tube can be interpreted as synonyms. Each tube 7 has sidewall/s 18 and open ends 19. Through said open ends 19 and through the empty space surrounded by the sidewall/s 18 the air can flow. Each cell/tube 7 has two edges in correspondence of said opposite ends 19. Said cells/tubes 7 are interconnected each other via their sidewalls 18 so as to form said honeycomb cellular insert 6. The sidewall/s 18 of the cell 7 are configured to irreversibly, or substantially irreversibly, buckle on itself/themselves. When the cells 7 are compressed and plastically deform, they absorb a great amount of energy.

The tubes 7 of FIG. 2A have circular cross-sections. In other embodiments (not shown), the cross-section of the cells/tubes 7 can be a square, a hexagon, a non-uniform hexagon, a re-entrant hexagon, a chiral truss, a diamond, a triangle or an arrowhead. Substantially, said tube 7 has upper and lower open bases having a polygonal and/or curved edges.

The cells/tubes 7 can be welded each other via their sidewalls 18. Alternatively, the tubes 7 can be bonded by means of adhesive layers interposed between adjacent sidewalls 18. Said adhesive layer is preferably a thermo-active adhesive. Preferably, the tubes 7 are interconnected so as to minimize the gap between adjacent tubes 7.

When the cells 7 have a circular cross-section, the outer diameter of the circular cross-section can range between 2.5 and 10 mm, preferably between 6 and 8 mm, and the wall thickness of said sidewall 14 can range between 0.04 and 0.15 mm. According to these dimensional values, the energy absorption is optimized. Furthermore, these values permit to achieve a very light honeycomb cellular insert 6.

The honeycomb cellular insert 6 so conceived has a thickness comprised between 5 mm and 30 mm.

The cells 7 of honeycomb cellular insert 6 can have longitudinal axes L inclined with respect to a surface of the frame 2, as shown in FIG. 2 for the honeycomb cellular insert 6 of the sitting portion 2A. Alternatively, the honeycomb cellular insert 6 can have cells 7 having longitudinal axes L substantially normal to the surface of the frame, as shown in FIG. 2 for the honeycomb cellular insert 6 of the back rest portion 2B.

When the cells 7 are inclined, the angle α comprised between the direction normal N to the inner/outer surface of the frame 2 and the longitudinal axis L of the cells is comprised between 5° and 45°. This inclination of the longitudinal axes L makes the honeycomb cellular insert 6 less stiff. Moreover, it allows to absorb more efficiently compressive loads that are not orthogonal to the frame 2. Honeycomb cellular inserts 6 having inclined cells are particularly recommended when the honeycomb cellular insert 6 faces toward the child area 3.

All the longitudinal axes L of the cells 7 are preferably parallel each other. Alternatively, if the honeycomb cellular insert 6 is a curved sheet, the longitudinal axes substantially point towards a common center of curvature.

When the honeycomb cellular insert 6 is curved and the underneath frame 2 is curved, they can have substantially the same curvature. In this way, the cells 7 are normal to the frame 2.

When the honeycomb cellular insert 6 is curved and the underneath frame 2 is flat, or vice versa, only some of these cells 7 are normal, or substantially normal, to the inner/outer surface of the frame 2 and all the other cells are inclined as described above.

In an alternative embodiment (not shown), the honeycomb cellular insert 6 can be a honeycomb sheet as described above comprising one or more slits. These slits are cuts realized along the thickness direction of the honeycomb sheet that do not pass-through it. Said slits involve only a portion of said honeycomb sheet thickness, preferably at least 50% of it. These slits reduce the initial compressive stress peak.

In a particular embodiment (not shown), the cells 7 of the honeycomb cellular insert 6 are pre-crushed, for reducing the initial compressive stress peak. "Pre-crushing" means that a longitudinal pre-compression of the cells 7 occurred so as to partially or slightly buckle the cells 7.

In a further embodiment (not shown), the honeycomb cellular insert 6 is laminated with a flexible sheet on one or both sides. The flexible sheet so connected to the free edges of the open ends 19 of the cells 7, allows to involve more cells 7 in the progressive plastic buckling.

When the impact absorbing assembly 4 is arranged onto the inner face of the frame 2, it comprises a deformable polymeric layer 5, preferably made of a polymeric foam, and one or more honeycomb cellular inserts 6. In this case, the impact absorbing assembly 4 constitutes the inner lining of child safety seat 1. The one or more honeycomb cellular inserts 6 can be arranged into or all the way through the deformable polymeric layer 5 as described in detail in the following.

Preferably, each portion of the child safety seat 1 comprises one honeycomb cellular insert 6. Consequently, the sitting portion 2A comprises its honeycomb cellular insert 6, the backrest portion 2B comprises its honeycomb cellular insert 6, and the side portions 2C comprise respective honeycomb cellular inserts 6, as shown in FIG. 2. Alternatively, only some of these portions 2A,2B,2C comprise honeycomb cellular inserts 6, for example only the backrest and sitting portions 2B,2A. Alternatively, the honeycomb cellular insert 6 is one for both these portions 2A,2B and it has a curved shape concordant with the shape of the frame 2.

Being the honeycomb cellular insert 6 a sheet, it can be easily inserted in the deformable polymeric layer 5.

The deformable polymeric layer 5 can be made of a rigid polymer closed-cell foam. Preferably, the polymeric foam is EPP (Expanded PolyPropylene) or EPS (Expanded PolyStyrene).

In particular, the honeycomb cellular insert 6 can be arranged above the deformable polymeric layer 5, so that the deformable polymeric layer 5 is sandwiched between the honeycomb cellular insert 6 and the frame 2, as shown in FIG. 1A. Alternatively, the honeycomb cellular insert 6 can be arranged under the deformable polymeric layer 5, so that the honeycomb cellular insert 6 is sandwiched between the deformable polymeric layer 5 and the frame 2, as shown in FIG. 1B.

Preferably, the honeycomb cellular insert 6 is sized to fit within the recess 8 of the deformable polymeric layer 5. Substantially, the outer shape of the honeycomb cellular insert 6 matches with the inner shape of the recess 8. In this way, the honeycomb cellular insert 6 is held in the recess 8 of the deformable polymeric layer 5 and, even if a force tends to in-plane compress the insert 6, it remains in place and does not get out the recess 8. This phenomenon can occur in case of an oblique impacts that moves laterally the honeycomb cellular insert 6 with respect to the deformable polymeric layer 5.

The recess 8 of the embodiments of FIGS. 1A and 1B is a pocket 8A of the deformable polymeric layer 5. In particular, the honeycomb cellular insert 6 is recessed and confined in the pocket 8A of the deformable polymeric layer 5 so as to be in contact with the frame 2, as shown in FIG. 1B, or so as to face toward the child area 3, as shown in FIG. 1A. The pocket 8A prevents a global translation of the honeycomb cellular insert 6 relative to the deformable polymeric layer 5.

With reference to FIG. 1A, when the honeycomb cellular insert 6 is arranged on the outer face of the deformable polymeric layer 5, the impact absorbing assembly 4 can be easily adapted to any shape of the frame 2, indeed the deformable polymeric layer 5 is easier to mould into complex shapes. On the contrary, when the honeycomb cellular insert 6 is arranged under the deformable polymeric layer 5, as shown in FIG. 1B, the deformable polymeric layer 5 allow to spread the energy of an impact over a wider area of the honeycomb cellular insert 6.

Alternatively, the deformable polymeric layer 5 can comprise one or more pass-through apertures 8B, that are like passing holes or cut-offs of the deformable polymeric layer 5, in which corresponding honeycomb cellular inserts 6 are inserted, as shown in FIG. 1C. In this case, the thickness of the honeycomb cellular inserts 6 is substantially the same of the deformable polymeric layer 5 and the honeycomb cellular inserts 6 and the deformable polymeric layer 5 are co-planar on both sides. In this way, the child safety seat 1 comprises zones wherein the performances in term of energy absorption of the impact absorbing assembly 1 are improved.

The portions 2A,2B,2C of the child safety seat 1 can comprise any one of the above described arrangements of honeycomb cellular insert 6 with respect to the deformable polymeric layer 5.

In FIG. 2 is represented a child seat 1 wherein the honeycomb cellular inserts 6 are recessed from inside in the deformable polymeric layer 5, but any other arrangement of FIGS. 1A-1C can be used as alternatives.

The surface of contact between the deformable polymeric layer 5 and the honeycomb cellular insert 6 can comprise a film or coating which prevents penetration of the honeycomb cellular insert 6 into the deformable polymeric layer 5 and facilitates a relative sliding between the honeycomb cellular insert 6 and the deformable polymeric layer 5. This film or coating is stiffer than the deformable polymeric layer 5, so as to allow said sliding and to avoid said penetration.

As shown in FIG. 1A-1C, the impact absorbing assembly 4 is attached or secured to the frame 2. Preferably said connection with the frame 2 of the deformable polymeric layer 5 is realized with an adhesive layer or with glue. Alternatively, the deformable polymeric layer 5 can be attached to the frame with screws. Otherwise, the honeycomb cellular insert 6 is fastened to the frame 2 through cable ties.

The deformable polymeric layer 5 and the frame 2 are preferably holed as shown in FIG. 2, so as to allow an air transit. An airflow can transit through the holes 14 of the deformable polymeric layer 5 and through the open cells 7 of the honeycomb cellular insert 6. Said airflow can also flow through the permeable seat cover 10, so as to cross the whole thickness of the seat 1. The holes 14 represented in FIG. 2 are arranged in the backrest portion 2A, but they can be arranged in any other portion of the child seat 1. The holes 14 of the deformable polymeric layer 5 lie in correspondence of the area wherein the honeycomb cellular insert 6 is arranged.

The thickness of the honeycomb cellular insert 6 is comprised between 30% and 100% of the thickness of the deformable polymeric layer 5, so as to improve the energy absorption.

In case of an accident of the vehicle, the deformable polymeric layer 5 is compressed and the honeycomb cellular insert 6 deforms absorbing a greater quantity of energy with respect to the deformable polymeric layer 5. Combining these two layers (deformable polymeric layer 5 and honeycomb cellular insert 6), a very efficient energy absorbing pad is obtained. This impact absorbing assembly 4 is capable to fit with all regulations in term of safety for child seats for vehicles. Moreover, the honeycomb cellular insert 6 continues to be contained in the deformable polymeric layer 5 even if compressed by the impact.

Even if FIGS. 1-4 show an impact absorbing assembly 4 having a deformable polymeric layer 5 arranged in the inner surface of the frame 2, the same type of impact absorbing assembly 4 can be also arranged on the outer surface of the frame 2.

The seat cover 10 can cover the entire impact absorbing assembly 4 or, if the impact absorbing assemblies 4 of the seat 1 are more than one, each impact absorbing assembly 4 is covered by its own seat cover 10. The seat cover 10 can also cover a part of the frame 2. The seat cover 10 is preferably made of a synthetic fabric or textile. The seat cover 10 can also comprise a soft permeable padding to make the impact absorbing assembly 4 more comfortable.

In a further embodiment, the seat cover 10 wraps completely the block composed by one honeycomb cellular insert 6 and one deformable polymeric layer 5, so as to realize a cushion (not shown). In this case, the inner lining of the child safety seat 1 can be composed by a plurality of interchangeable cushions so conceived. The cushion can be selected as a function of the weight/height of the child. In this way, each cushion is constituted by the seat cover 10, the honeycomb cellular insert 6 and the soft foam layer 12. In this embodiment, the impact absorbing assembly 4 (the cushion) so conceived is connected to the frame 2 through reversible connecting means, like for example snap buttons or similar devices. The child safety seat 1 so realized is modular and with a single frame 2 and a different types of cushions, several customizable versions of the seat 1 can be realized for different needs in term of weight/height.

When the impact absorbing assembly 4 is arranged on the outer face of the frame 2, so as to face outwardly as shown in FIG. 1D, it comprises a deformable polymeric shell 5', that represents the deformable polymeric layer 5, and a honeycomb cellular insert 6. The honeycomb cellular insert 6 is surrounded by the deformable polymeric shell 5' so that only one side of the honeycomb cellular insert 6 remains in contact with the frame 2. The cells 7 of the honeycomb cellular insert 6 have parallel longitudinal axes L and are orthogonal to the outer surface of the frame 2 or inclined with respect to it, as described above.

The deformable polymeric shell 5' is preferably made of an elastomeric material, like rubber, so as to be resilient. The deformable polymeric shell 5' comprises an inner chamber fitting with the outer shape of the honeycomb cellular insert 6. The honeycomb cellular insert 6 is accommodated in said inner chamber before fixing the deformable polymeric shell 5' to the frame 2. The deformable polymeric shell 5' is firmly attached to the frame 2 so as to maintain the honeycomb cellular insert 6 in contact with the outer surface of the frame 2. The open ends belonging to the same side of the honeycomb cellular insert 6 are thus in contact with said outer surface of the frame 2. The outer impact absorbing assembly 4 so conceived works like an external bumper for the child safety seat 1.

In case of an accident of the vehicle that reach the child seat 1, the deformable polymeric shell 5' flexes and the underlying honeycomb cellular insert 6 plastically deforms. In this way, the external impact absorbing assembly 4 absorbs a very high quantity of the impact energy transmitted by the vehicle to the child seat 1.

As shown in FIG. 1, the impact absorbing assembly 4 arranged on the outer face of the frame 2 with a honeycomb cellular insert 6 surrounded by the deformable polymeric shell 5' is not an alternative to the impact absorbing assembly 4 arranged on the inner face of the frame 2. Indeed, a synergic protective effect for the child safety seat 1 can be achieved if both inner and outer impact energy absorbing assemblies 4 are used.

The child safety seat 1 can also comprise a base 15 as shown in FIG. 2. The base 15 can be the lower part of the child safety seat 1 remaining attached to the vehicle 30, even if the upper part is detached for different needs. The base 15 is configured to be connectable to the frame 2 of the child safety seat 1. The base 15 also comprises a honeycomb cellular insert 6 that is arranged on a bulk portion of the base so as to remain in contact with the frame 2. This honeycomb cellular insert 6 allows to absorb certain sudden movements of the frame 2 with respect to the vehicle 30. If the frame 2 inclines with respect to the base 15, the honeycomb cellular insert 6 of the base deforms, absorbing the energy of this compression.

In a particular embodiment of the present invention, the child safety seat can comprise a comfort cushion 11. This comfort cushion 11 is a detachable insert shaped so as to be arrangeable in the child safety seat 21, between the impact absorbing assembly 2 and the child (child area 3), as shown in FIGS. 1,2 and 3. This comfort cushion 11 can be a traditional comfort cushion made of a soft permeable foam or an improved comfort cushion 11 as shown in FIGS. 1, 1E and 2. This improved comfort cushion 11 comprises a soft foam layer 12 and a honeycomb cellular layer 13. The honeycomb cellular layer 13 is a thin honeycomb sheet that is structurally similar to the above-described honeycomb cellular insert 6.

The honeycomb cellular layer 13 can be thinner than the honeycomb cellular insert 6. The honeycomb cellular layer 13 can comprise cells having a wider cross-sectional area with respect to that of the honeycomb cellular insert 6. Consequently, the honeycomb cellular layer 13 is flexible and can be easily folded for inserting/removing the comfort cushion 11 in/from the child safety seat 1. The honeycomb cellular layer 13 is attached to the soft foam layer 12 through an adhesive. The soft foam layer 12 is preferably arranged so as to face towards the child area 3. The pack constituted by the soft foam layer 12 and the honeycomb cellular layer 13 is wrapped by a fabric or textile. The comfort cushion 11 makes the child seat 1 more comfortable. Furthermore, this comfort cushion 11 is removable and thus washable. The comfort cushion 11 with the honeycomb cellular layer 13 also improves the energy absorption in case of an impact.

The comfort cushion 11 also allows to customize the inner side of the child safety seat 1 (the child area 3). Indeed, through comfort cushions 11 having different sizes, shapes and internal characteristics (e.g. a different thickness of the honeycomb cellular layer 13), the same child safety seat 1 can be adapted to an infant, a young child or an older child, by simply modifying the comfort cushion 11.

In the FIGS. 3 and 4 are schematically represented other two types of child safety seats 1 according to this invention. In FIG. 3 is represented a child safety seat 1 for enfant. In FIG. 4 is represented a child safety seat 1 for children that are older than that using the child safety seat 1 of FIG. 1. The same considerations described above for the child safety seat 1 of FIGS. 1 and 2 apply to the child safety seats of FIGS. 3 and 4.

Concluding, the invention so conceived is susceptible to many modifications and variations all of which fall within the scope of the inventive concept, furthermore all features can be substituted to technically equivalent alternatives. Practically, the quantities can be varied depending on the specific technical requirements. Finally, all features of previously described embodiments can be combined in any way, so as to obtain other embodiments that are not herein described for reasons of practicality and clarity.

The invention claimed is:

1. Child safety seat for a vehicle comprising:
   a frame shaped so as to accommodate a child in a child area, the frame comprising a sitting portion, a backrest portion and side portions;
   at least one impact absorbing assembly connected to the frame and comprising:
   a deformable polymeric layer;
   at least one honeycomb cellular insert associated with the deformable polymeric layer; wherein the at least one honeycomb cellular insert comprises a plurality of open cells having longitudinal axes extending out of an inner/outer surface of the frame, said cells being configured to absorb energy by plastic deformation in response to a longitudinal compressive load applied to said cells;
   wherein the deformable polymeric layer is shaped so as to contain the at least one honeycomb cellular insert; and
   wherein the impact absorbing assembly faces from the frame towards the child area in which the child can sit.

2. Child safety seat according to claim 1, wherein said longitudinal axes are at least in part normal to said inner or outer surface of the frame.

3. Child safety seat according to claim 1, wherein said longitudinal axes are at least in part inclined by an angle comprised between 5° and 45° with respect to a direction normal to said inner or outer surface of the frame.

4. Child safety seat according to claim 1, wherein the honeycomb cellular insert is sized to fit within a recess of the deformable polymeric layer.

5. Child safety seat according to claim 4, wherein the at least one honeycomb cellular insert is arranged between the deformable polymeric layer and the frame or, alternatively, the deformable polymeric layer is arranged between the at least one honeycomb cellular insert and the frame.

6. Child safety seat according to claim 5, wherein said recess is a pocket wherein the honeycomb cellular insert is accommodated.

7. Child safety seat according to claim 4, wherein said recess is a passing-through aperture in the deformable polymeric layer wherein the honeycomb cellular insert is arranged so that the deformable polymeric layer and the honeycomb cellular insert are flush.

8. Child safety seat according to claim 1, wherein deformable polymeric layer and frame comprise a plurality of pass-through holes arranged in correspondence of the honeycomb cellular insert.

9. Child safety seat according to claim 4, wherein the deformable polymeric layer is a portion of the baby seat on which the child sits.

10. Child safety seat according to claim 1, further comprises a breathable seat cover configured to cover at least part of the frame and the impact absorbing assembly.

11. Child safety seat according to claim 1, wherein the at least one honeycomb cellular insert is arranged in correspondence of said sitting portion so as to lie below the child, and/or in correspondence of said backrest portion so as to lie behind the spine and/or head of the child, and/or in correspondence of said side portions so as to lie besides shoulders and/or hips and/or head of the child.

12. Child safety seat according to claim 1, wherein the side portions of the frame comprise two lateral head support portions and, when the impact absorbing assembly is arranged in correspondence of each of said two lateral head support portions of the frame so as to face outwards, the deformable polymeric layer is shaped so as to surround the at least one honeycomb cellular insert so that the honeycomb cellular insert remains in contact with an outer surface of frame and the deformable polymeric layer protrudes outwardly from said outer surface of the frame.

13. Child safety seat according to claim 1, further comprising a base connectable to the frame, wherein said base comprises a honeycomb cellular insert.

14. Child safety seat according to claim 1, comprising a comfort cushion arranged between the impact absorbing assembly and the child area, wherein the comfort cushion comprises a soft foam layer arranged towards the child area and a honeycomb cellular layer arranged between the soft foam layer and the impact absorbing assembly.

15. Child safety seat according to claim 9, wherein the deformable polymeric layer is made of a rigid polymeric closed-cell foam.

16. Child safety seat according to claim 10, wherein the seat cover is made of a fabric.

17. Child safety seat for a vehicle comprising:
a frame shaped so as to accommodate a child in a child area, the frame comprising a sitting portion, a backrest portion and side portions;
at least one impact absorbing assembly connected to the frame and comprising:
a deformable polymeric layer;
at least one honeycomb cellular insert associated with the deformable polymeric layer; wherein the at least one honeycomb cellular insert comprises a plurality of open cells having longitudinal axes extending out of an inner/outer surface of the frame, said cells being configured to absorb energy by plastic deformation in response to a longitudinal compressive load applied to said cells;
wherein the deformable polymeric layer is shaped so as to contain the at least one honeycomb cellular insert;
wherein the side portions of the frame comprise two lateral head support portions and the impact absorbing assembly is arranged only in correspondence of each of said two lateral head support portions of the frame so as to face outwards, and
wherein the deformable polymeric layer is shaped so as to surround the at least one honeycomb cellular insert so that the honeycomb cellular insert remains in contact with an outer surface of frame and the deformable polymeric layer protrudes outwardly from said outer surface of the frame.

18. Child safety seat for a vehicle comprising:
a frame shaped so as to accommodate a child in a child area, the frame comprising a sitting portion, a backrest portion and side portions;
at least one impact absorbing assembly connected to the frame and comprising:
a deformable polymeric layer;
at least one honeycomb cellular insert associated with the deformable polymeric layer; wherein the at least one honeycomb cellular insert comprises a plurality of open cells having longitudinal axes extending out of an inner/outer surface of the frame, said cells being configured to absorb energy by plastic deformation in response to a longitudinal compressive load applied to said cells;
wherein the deformable polymeric layer is shaped so as to contain the at least one honeycomb cellular insert;
wherein the impact absorbing assembly faces towards the child area; and
wherein the deformable polymeric layer and the frame comprise a plurality of pass-through holes arranged in correspondence of the honeycomb cellular insert.

* * * * *